United States Patent
Saripalli

(10) Patent No.: US 8,249,089 B2
(45) Date of Patent: Aug. 21, 2012

(54) METHODS FOR PUSHING ADDRESS TRANSLATIONS MAPPINGS TO PCI EXPRESS ENDPOINTS

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1727 days.

(21) Appl. No.: 11/541,713

(22) Filed: Sep. 29, 2006

(65) Prior Publication Data

US 2008/0080491 A1    Apr. 3, 2008

(51) Int. Cl.
*H04L 12/54* (2006.01)
(52) U.S. Cl. .......................................... 370/428; 370/475
(58) Field of Classification Search .................. 370/378, 370/428, 475
See application file for complete search history.

(56) References Cited

U.S. PATENT DOCUMENTS

| | | | |
|---|---|---|---|
| 5,758,182 A * | 5/1998 | Rosenthal et al. | 710/3 |
| 6,009,488 A | 12/1999 | Kavipurapu | |
| 6,859,867 B1 * | 2/2005 | Berry | 711/206 |
| 2002/0038437 A1 * | 3/2002 | Hogdal et al. | 714/25 |
| 2002/0181395 A1 * | 12/2002 | Foster et al. | 370/229 |
| 2003/0061499 A1 * | 3/2003 | Durrant | 713/189 |
| 2004/0260905 A1 * | 12/2004 | Cypher et al. | 711/203 |
| 2005/0207421 A1 * | 9/2005 | Suzuki | 370/392 |
| 2007/0043928 A1 * | 2/2007 | Panesar et al. | 711/206 |
| 2007/0113044 A1 * | 5/2007 | Day et al. | 711/207 |

* cited by examiner

*Primary Examiner* — Sai-Ming Chan
(74) *Attorney, Agent, or Firm* — Blakely, Sokoloff, Taylor & Zafman LLP

(57) ABSTRACT

A method and system for improving throughput and speed of an interconnect system such as peripheral component interconnect express (PCIe). The method and system automatically forward changes in virtual address translation data to each device that supports the system and method on the interconnect system. This improves performance by obviating the need for the devices to request address translation services each time a direct memory access is made, thereby diminishing the amount of overhead traffic on the interconnect system.

25 Claims, 4 Drawing Sheets

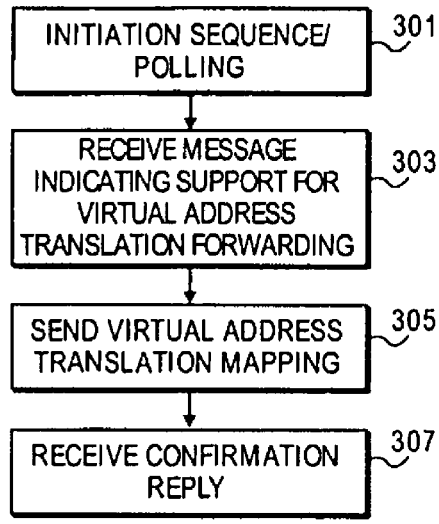
FIG. 3
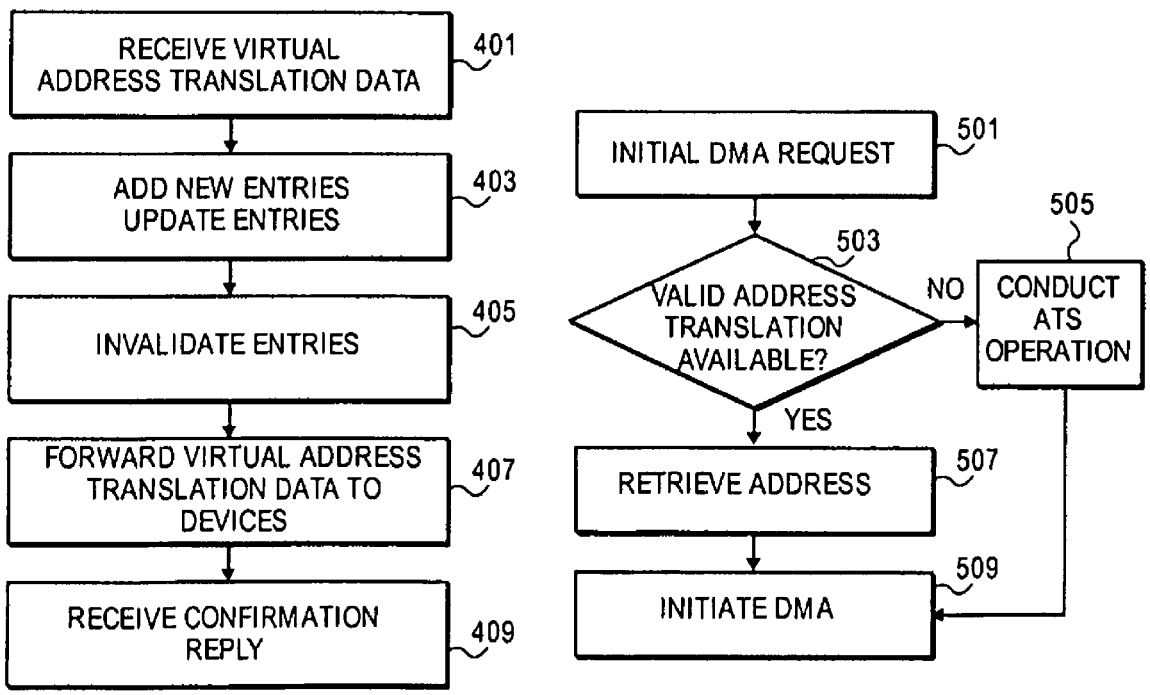
FIG. 4
FIG. 5

US 8,249,089 B2

METHODS FOR PUSHING ADDRESS TRANSLATIONS MAPPINGS TO PCI EXPRESS ENDPOINTS

BACKGROUND

1. Field of the Invention

The invention relates to a method and apparatus for optimizing the operation of an interconnect in a computer system. Specifically, the method and apparatus reduce unnecessary traffic on an interconnect system by pushing virtual address translation data to the endpoints of the interconnect system.

2. Background

Computer systems have internal communication systems to transfer data. These internal communication systems include a set of interconnects. The interconnects provide data communication between the components of the system. However, these interconnects can also be bottlenecks for system performance if they are not able to keep up with the demands of the components of the system.

The peripheral component interconnect (PCI) system is a standard system for providing communication between a set of peripheral components and the other components of the computer system including the processor and the main memory. The PCI system has been periodically revised to increase its speed and throughput. The updated systems are known as PCI-X and the PCI express (PCIe) system. The PCI-X system is a shared bus with improved system performance over the original PCI system.

The PCIe system is a set of point-to-point interconnects with further improvements in performance. The PCIe system includes a root controller or port in a controller hub. The root controller is responsible for transmitting and receiving data from other components and placing it on the appropriate PCIe interconnect. The root port also receives data and requests from the peripheral components on the PCIe system and passes these data and requests to the appropriate component.

The peripheral components make direct memory access (DMA) requests. DMA requests are to access areas of main memory to retrieve or write data. Peripheral components typically have a virtual address range assigned by an operating system that they are allowed to access and write to. The peripheral components request and retrieve mapping data that allows them to determine the physical addresses, corresponding to the virtual addresses used by the component, of the memory location for a DMA transaction. However, the requests for translation data create excessive traffic over the PCIe system degrading performance. Instead of servicing actual accesses to memory, the PCIe system must service address translation requests thereby diminishing the throughput and speed of the PCIe system.

DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 3 is a flowchart of one embodiment of a process for virtual address translation forwarding support detection.

FIG. 4 is a flowchart of one embodiment of a process for virtual address translation data updating.

FIG. 5 is a flowchart of one embodiment of a process for handling a direct memory access request.

DETAILED DESCRIPTION

Figure 1A:
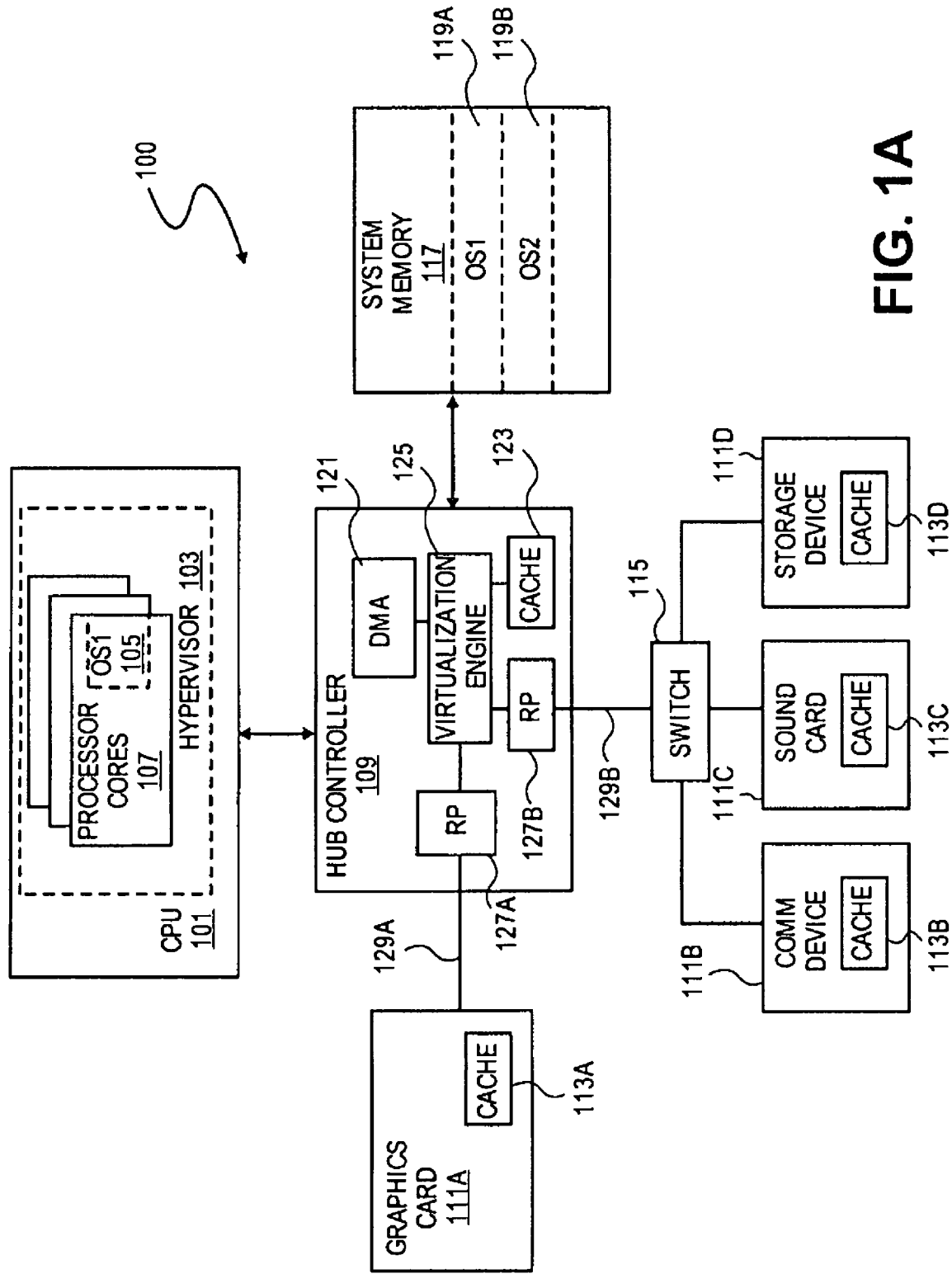
FIG. 1A is diagram of one embodiment of a computer system including an optimized PCIe system.

FIG. 1A is diagram of one embodiment of a computer system including an optimized PCI type system. The embodiments of the invention may related to any type of PCI system including PCI, PCI 2.0, PCI-X, PCIe or similarly interconnect systems. For sake of clarity the embodiments described further herein are PCIe embodiments. One skilled in the art would understand that the principles, methods and structures described are also applicable to these other interconnect standards and are provided by way of example and not to limit the scope of the invention.

In one embodiment, the computer system 100 may include a central processing unit (CPU) 101. The central processing unit 101 may be a single processor, multiple processors, a single processor package with a set of processing cores 107, multiple processors each with multiple cores or similar processor configurations. As used herein, a set may be any number of items including one item. The central processing unit 101 may execute software retrieved from system memory 117, peripheral storage devices 111D and similar storage components. The software executed may include applications, operating systems 105, a hypervisor 103 and similar software. A hypervisor 103 may be a program that manages multiple operating systems 105 in a single computer system. The hypervisor 103 may manage resources and data traffic to ensure that each operating system has access to the appropriate resources and receives the proper data from other components. The hypervisor 103 may be responsible for the boot up sequence of the system and the initiation of each operating system 105.

The central processing unit 101 may communicate with other system components through a controller hub 109 or set of controller hubs. The controller hub 109 may be a separate component or may be on the same die or in the same package as the central processing unit 101. In one embodiment, the hub controller 109 may be divided into a 'north bridge' or memory hub and a 'south bridge or input/output (I/O) hub. Each bridge may be responsible for communication or interfacing with a different set of components. The bridges may communicate through an interconnect system.

In one embodiment, the controller hub 109 may include a set of root ports 127A, 127B for communicating over PCIe interconnects 129A, 129B with a set of peripheral devices 111A-111D. The root ports 127A, 127B may be interface units that communicate with other hub controller 109 components and mange traffic over their respective interconnects 129A, 129B. The root ports 127A, 127B may serve as an interface to the PCIe system for the other components of the hub 109 as well as other components of the computer system generally.

The controller hub 109 may also include a direct memory access (DMA) controller 121. The DMA controller 121 may govern or support DMA requests from the components of the system including the central processor unit 101, peripheral components 111A-111D and similar components. The DMA controller 121 may work in conjunction with a virtualization engine 125 to restrict access to system memory 117. In this manner these components, together or individually serve as gatekeepers for system memory 117 accesses.

In one embodiment, each operating systems 105 may be restricted to a defined memory range that is assigned to that operating system 105. Applications and devices associated with an operating system 105 may also be restricted to that memory range. Applications and devices may be further limited to memory ranges specifically assigned to the application or device during the initialization process.

In one embodiment, a virtualization engine 125 supports the virtualization of resources in the computer system for use in multiple operating system environments and similar environments. In a multiple operating system environment, it is advantageous to allow multiple operating systems to access the same resources to limit redundancy in the computer system and maximize the utility to a user. If each resource is limited to use by a single operating system 105 then, for example, for each operating system 105 to communicate over a network would have to utilize a separate physical communication device, thereby requiring to PCIe slots to be utilized in the computer system. However, a single resource such as a communication device 111B may be virtualized by creating multiple virtual instances of the device. Each virtual instance may be assigned to a separate operating system 105 and assigned its own memory range within the memory space or system memory 117 of the appropriate operating system 105.

The virtualization engine 125 assists the virtualization process by providing address translation services for virtualization instances and similar services. The virtualization engine 125 may maintain a cache 123 including mappings between the virtual addresses assigned to each virtual instance of a resource and the corresponding physical address. The virtualization engine 125 provides these address mappings in response to a device or virtual instance request for the virtual instances or devices that do not support virtual translation address forwarding.

In one embodiment, the virtualization engine 125 also provides the virtual address translation data automatically upon detection of an update, initialization or similar change to the virtual address translation mappings in the cache 123 to the virtual instances and devices that support virtual address translation forwarding. These devices and virtual instances that support forwarding then cache the received data in caches within the respective devices. The devices or virtual instances may provide a reply response indicating reception of the virtual address translation data. The automatic forwarding process decreases the amount of traffic over the PCIe system because each device that supports the virtual address translation data forwarding will only need to request translation data if the device or virtual instance does not have valid cache entries for a requested virtual address translation. The likelihood of such a cache miss is low because each update to the virtual address translation data relevant to a device or virtual instance is forwarded to that device.

In one embodiment, the computer system 100 may include system memory 117. The system memory 117 may be defined by a physical address space. The physical address space is a range of physical addresses available for the physical storage components of the system memory 117. Applications, devices and operating systems are typically not aware of the physical address space that they are utilizing. Instead they use a relative virtual address space. The hub controller 109 including the DMA controller 121 and virtualization engine 125 are responsible for making the translation between physical and virtual memory addresses. For example, a first operating system may be assigned a first physical address space 119A over the range of 0x0 to 0x000FFFFFF and a second operating system may be assigned a physical address space 119B over the range of 0x001000000 to 0x001FFFFFF. However, each operating system 105 may utilize a virtual address space of 0x0 to 0xFFFFFF. The hub controller 109 maps these virtual address spaces to the physical address spaces in a process that is transparent to the operating systems 105.

In one embodiment, the computer system may have at least one set of PCIe interconnects 129A, 129B. The interconnects 129A, 129B may connect a single device to a root port or may connect a root port to a switch that provides additional interconnects with devices or further switches. A root port may be ultimately connected with any number of devices through any number of intermediate switches.

In one embodiment, the system 100 may include a graphics card 111A to provide graphics and video processing power to generate a display for the computer system 100. The graphics card 111A may be connected to the hub 109 directly by an interconnect 129A between the card and a root port 127A. The graphics card 111A may include a cache 113A in which it may store virtual address translation data. In another embodiment, the graphics card 111A may be connected with a root port that is shared with other devices through a switch or set of switches.

In one embodiment, the system 100 may include a set of peripheral components 111B-111D that are in communication with a hub controller 109 through a set of interconnects and at least one switch 115. The set of peripheral components 111B-111D may include any type of component including a communication device 111B, a sound card 111C, a storage device 111D (e.g., a compact disk player, digital versatile disc player, a fixed disk or hard drive or similar component) or similar device. Each of the devices may include a separate cache 113B-113D to store virtual address translation data relevant to that device or virtual instances of that device.

In one embodiment, the system may include a communication device 111B. The communication device may be a wireless transmitter and receiver (e.g., an 802.11 b/g, Bluetooth or similar wireless technology) a wire line network card (e.g., an Ethernet card, token ring card or similar type of wireline technology) or similar device.

In one embodiment, other system components may be connected to the computer system 100 through other types of interconnects such as advanced technology attachment (ATA) buses, industry standard architecture (ISA) buses or similar interconnect types. For example, fixed disks may be connected to the hub controller 109 through an ATA type interconnect.

Figure 1B:
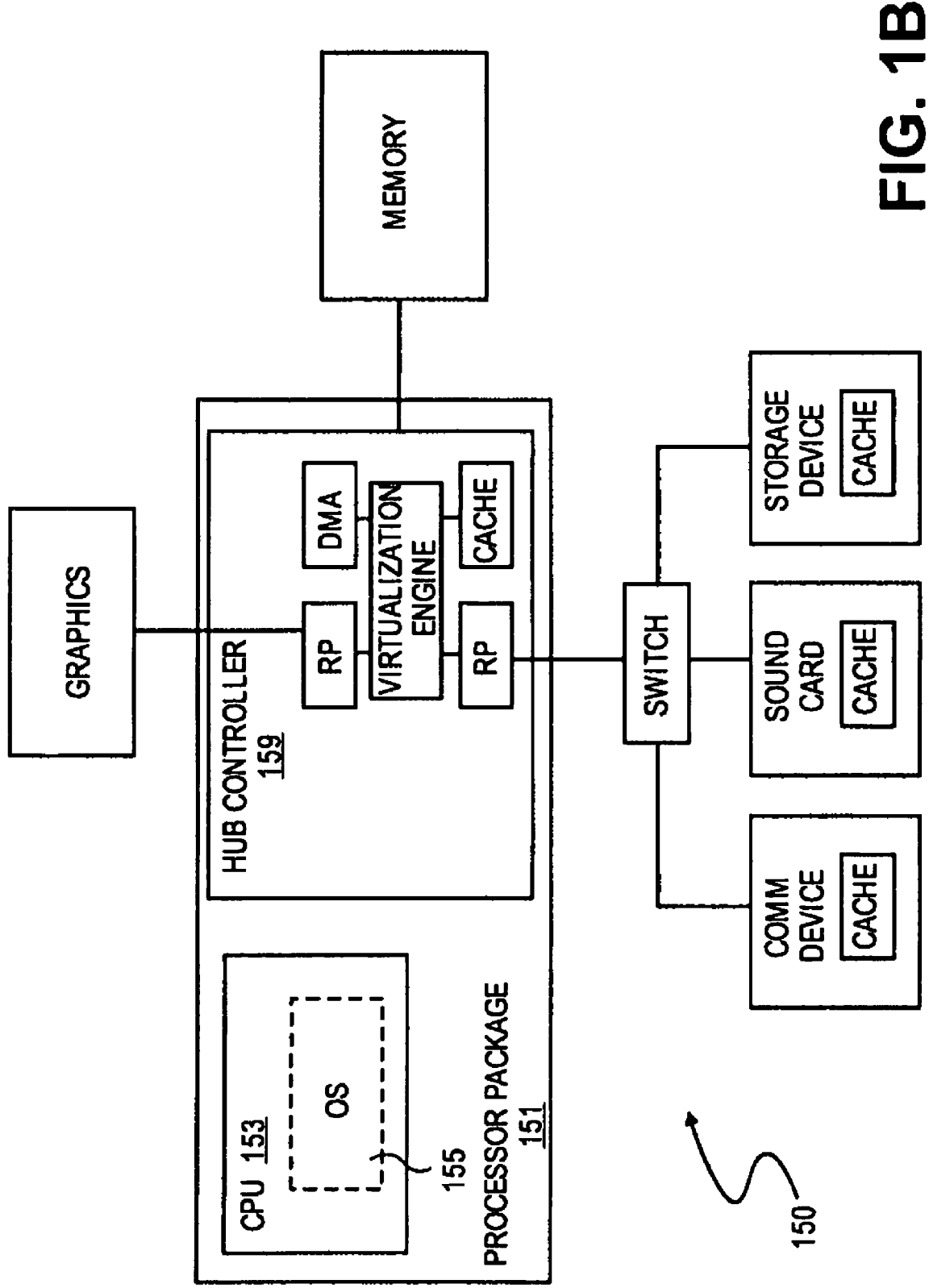
FIG. 1B is diagram of one embodiment of a computer system including an optimized PCIe system.

FIG. 1B is diagram of one embodiment of a computer system including an optimized PCIe system. In one embodiment, a computer system 150 may have a central processing unit 153 and hub controller 159 in the same package 151 or on the same die. The central processing unit 153 and hub controller 159 may be placed in the same package 151 or on the same die to conserve space, improve communication speed or throughput, reduce costs or to provide similar advantages.

In one embodiment, a computer system 150 may have a single processor 153 with a single core. Any combination of processors, processor cores and controllers such as the hub controller 159 may be placed in the same package 151 or on the same die. In one embodiment, multiple processors in separate packages may be utilized with a single hub controller or a set of hub controllers in another package. Processors and hub controllers in separate packages may be connected through any type of interconnect including PCI type interconnects.

In one embodiment, an operating system 155 or application may be executed by a single processor. In other embodiments, an operating system 155 may be executed across multiple processors, processor cores or similarly executed. A hypervisor (not shown) may be executed by a single processor, processor core or a set of processors or processor cores. The hypervisor may be distributed across multiple processors and packages.

Figure 2:
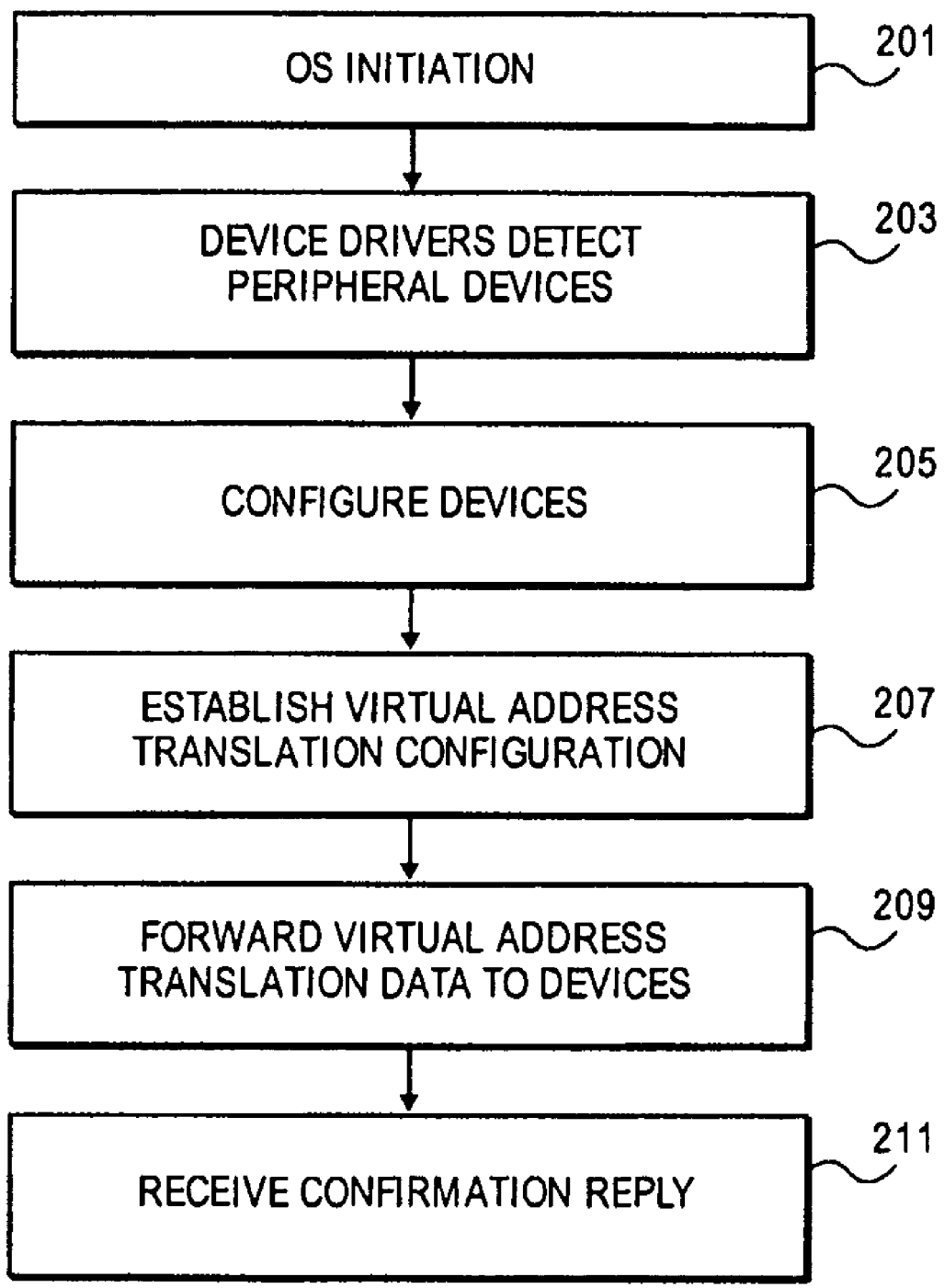
FIG. 2 is a flowchart of one embodiment of a process for device initialization by a driver and operating system.

FIG. 2 is a flowchart of one embodiment of a process for device initialization by a driver and operating system. In one embodiment, during the startup of the computer system the operating system is loaded and executed by the basic input/output system (BIOS) or similar system. The operating system may load needed software components and initialize and enable needed hardware components (block 201). Software components that are loaded by an operating system during initialization may include drivers for computer system components. These drivers may have been previously installed and registered with the operating system.

In one embodiment, during the start up of the operating system the device drivers registered with the operating system may check to determine if compatible or corresponding device are present in the system for each registered device driver (block 203). The devices may be detected through any type of detection mechanism including plug and play, polling and similar detection mechanisms. The computer system may also detect devices for which a corresponding device driver has not been registered and search for a corresponding driver on the computer system, over a network or in similar locations. The operating system may also prompt a user to provide or designate an appropriate device driver.

In one embodiment, if a device is detected by a device driver the driver may configure the device and associated software for the device (block 205). This may include setting registers in the device and loading software needed to utilize the device. In one embodiment, the device driver may register the device or similarly establish an address range for the device (block 207). The operating system or the driver may notify the hub controller including the virtualization engine of the assigned range. The hub controller may then determine a mapping or translation of this range to physical address space for the system memory. This virtual address translation data may be stored in a memory device local to the hub controller such as a cache or similar memory device within the hub.

In one embodiment, the virtualization engine may detect or determine which device the received translation data corresponds to and generate a notification message for the device. A device may be identified by a device ID, vendor ID number or similar indicator or reference number for a device. The notification message may be used to forward the virtual address translation data to the device (block 209). In one embodiment, all of the virtual address translation data related to a device or a virtual instance of the device may be sent to the device upon receipt or determination. Virtual address translation data that may be specific to a virtual instance may be identified, labeled or tagged by a virtual instance ID or similar indicator.

In another embodiment, only the virtual address translation data that has changed or is new is sent to the device. The virtual address translation data may be sorted or similarly organized to generating forwarding messages for each device that had corresponding virtual address translation data or related data changed. In a further embodiment, all changes may be broadcast to all devices and the devices or virtual instances may determine which data is relevant to them and cache that data.

In one embodiment, each device that receives virtual address data may send a reply message confirming receipt of the virtual address data. The reply message may indicate the data that was received, for example in the form of a checksum or similar data check. In another embodiment, the devices may not provide a reply message. The devices update their individual caches with the received virtual address translation data. The devices may invalidate old cache entries, create new cache entries or update existing entries.

The frequency of virtual address translation updates or changes is relatively low. The resulting forwarding messages are likewise relatively low in frequency in comparison with the number of address translation service requests that are required without the automatic forwarding scheme.

FIG. 3 is a flowchart of one embodiment of a process for virtual address translation forwarding support detection. In one embodiment, a virtualization engine or similar component detects the support for virtual address translation forwarding of each device in the system. Any number or combination of devices in the system may support the automatic forwarding. However, any number or combination of devices may also not support the automatic forwarding. The virtualization engine or similar component detects the supporting devices so that only those supporting devices receive the automatic updates to optimize the throughput of the system. If the virtualization engine or similar component does not restrict the automatic forwards of virtual address translation data to the supporting devices in the system, then the performance of the system may be impacted because the non-supporting devices would receive the automatic forwarding messages in addition to generating the address translation service requests thereby increasing overall traffic in the system.

In one embodiment, at start up, when new devices are detected or during similar situations, the virtualization engine or similar component may perform an initialization sequence for each new device or uninitialized device, in addition to the configuration performed by the operating system and driver for the device (block 301). The virtualization engine may set up cache space or entries for the new devices and set registers corresponding to the characteristics or state of the device or perform similar operations. In one embodiment, the virtualization engine or similar component may perform a polling operation to prompt the new devices to provide virtual address forwarding support information or similar information.

In one embodiment, the virtualization engine or similar component may receive a message from each new device indicating support for the virtual address forwarding service (block 303). If the message indicates support the virtualization engine may flag the device or similarly store an indicator of support for the device. The virtualization engine may also track a set of virtual instances associated with the device. In one embodiment, the support message may be generated by the device during its initialization or configuration. The message may be generated at the direction of commands from a driver or similar component. In another embodiment, the message may be generated in response to polling from the virtualization engine.

In one embodiment, a device may be flagged or assumed to not support the virtual address translation data forwarding if it does not provide a support message during an initialization period, during a predefined period, in response to polling or under similar circumstances. In another embodiment, all devices may be assumed to not support the forwarding service. In one embodiment, the forwarding service for a device may be enabled at any time by reception of a message from the device indicating support. In another embodiment, if the support message is not received during a designated time or under designated circumstances then the device may not be able to enable the forwarding service or receive the update messages.

In one embodiment, after an indication of support is received, the virtualization engine or similar component may forward the current virtual address translation data to the device (block 305). The data forwarded to the device may be sorted or filtered to be limited to data relevant to the device (e.g., virtual address translations for the assigned range of the device). The forwarded data may also be limited to currently valid entries and similar limitations may be applied to minimize the size of messages and the amount of data that must be transmitted over the interconnect system to optimize performance.

In one embodiment, after the device receives the virtual address translation data, it may generate a reply message to acknowledge receipt of the data (block 307). The reply message may include an indication of the data received or the message received. If a reply message is not received within a designated time period the virtual address translation data may be resent. In another embodiment, the device may not provide a reply. In a further embodiment, the device may periodically invalidate old entries or request the virtual address translation data to ensure that the local cache is up to date. If invalid translations are utilized the virtualization engine may send an invalidation message for the out of date data.

FIG. 4 is a flowchart of one embodiment of a process for virtual address translation data updating. Virtual address translation data may be updated by a device driver, an operating system, hypervisor or similar program. An address range may be resized, additional ranges assigned to a device or similar changes may result in changes to virtual address translation data. These programs may set registers in the hub controller, send a message to the hub and virtualization engine, update the virtual address translation data cache or similarly provide updated virtual address translation data (block 409).

In one embodiment, the virtualization engine may be responsible for maintaining the virtual address translation cache or similar data structure. Upon receiving updated data the virtualization engine may update the cache by adding new entries to the cache (block 403). The virtualization engine may search the cache to find corresponding entries. If no corresponding entries are found matching the incoming data then the new entries may be added. If existing entries are found that match (e.g., match the device, virtual instance, or similar characteristics) then the entries are updated. The virtualization engine may also determine if any entries are to invalidated (block 405). An entry may invalidated if a new entry is added instead of updating an old entry, if a change is made that does not replace old address translation data or under similar circumstances. In one embodiment, the program making a change may send a complete set of virtual address translations and any current entry that is not in the set may be invalidated.

In one embodiment, after all entries have been updated, added or invalidated as needed, the virtualization engine may determine which devices or virtual instances need to be informed of the changes by applying a sorting, filtering, searching or similar algorithm. A message may then be generated for each device that includes a change (block 407). Each message may include only the updated information or may contain all the data relevant to the device or virtual instance. The virtualization engine may await a reply message confirming receipt (block 409). If a reply message is not received, the data may be resent. The reply message may identify the data or message that was received.

FIG. 5 is a flowchart of one embodiment of a process for handling a direct memory access (DMA) request. DMA request are generated by devices that seek to transfer data from the device to memory or read data from memory. The devices have assigned address ranges that they are allowed to access. The virtualization engine and DMA controller may police the accesses of devices and virtual instances to ensure that only the designated areas are accessed.

A device may initiate a DMA request to read or write data to system memory (block 501). The request may contain the address, length, data to be written and similar data. The device typically starts with a virtual address for the data and needs to determine the physical address for the data. The device checks a local virtual address translation cache to determine if the needed translation is present (block 503). If the data is not present then the device may use the address translation service (ATS) to obtain the needed physical address (block 505). The ATS sends a message to the hub including the virtual address and receives a response message with the corresponding physical address. The address may then be used to start the DMA process (block 509). If the address is present in the cache and the cache entry is valid then the value is retrieved and used for the DMA process (block 509)

In one embodiment, the virtualization engine and virtual address translation address forwarding process are implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving virtual address translation data by a hub controller for a first device from an operating system component, the virtual address translation data including virtual address mapping data for a virtual instance of the first device;
   storing the virtual address translation data in a local memory device; and
   forwarding the virtual address translation data to the first device without a request from the first device, the forwarding of the virtual address translation data to reduce unnecessary traffic on an interconnect system.

2. The method of claim 1, further comprising:
   determining a set of virtual address translation data corresponding to the first device.

3. The method of claim 1, further comprising:
   receiving an indication of support for virtual address forwarding.

4. The method of claim 1, further comprising:
   polling a first device to determine support for virtual address forwarding.

5. The method of claim 1, further comprising:
receiving a change in the virtual address translation data for the first device.

6. The method of claim 5, further comprising:
forwarding the change in virtual address translation to the first device without a request from the first device.

7. The method of claim 1, further comprising:
preventing access to a memory location not associated with a requesting virtual device.

8. The method of claim 1, wherein the local memory is a cache in a hub controller.

9. The method of claim 1, wherein the virtual address mapping data defines a relationship between virtual addresses assigned to the virtual instance of the first device and physical addresses in system memory.

10. The method of claim 1 further comprising:
restricting direct memory access requests based on the virtual address translation data.

11. An apparatus comprising:
a virtualization engine to receive virtual address translation data for a first device from an operating system and to provide device virtualization for the first device and to forward the virtual address translation data to the first device automatically upon receipt of the virtual address translation data from the operating system, the virtual address translation data including virtual address mapping data for a virtual instance of the first device; and
a memory local to the virtualization engine to store the virtual address translation data.

12. The apparatus of claim 11, wherein the memory is a cache.

13. The apparatus of claim 11 further comprising:
a communication port to transmit the virtual address translation data to the first device.

14. The apparatus of claim 13, wherein the communication port is a root controller of an interconnect.

15. The apparatus of claim 14, wherein the interconnect is a peripheral component interconnect express (PCIe) interconnect.

16. The apparatus of claim 11, wherein the first device is a peripheral device with a cache for storing virtual address translation data.

17. The apparatus of claim 11, further comprising:
a direct memory access controller in communication with the virtualization engine to control data transfer between the first device and a main memory.

18. A system comprising:
wireless transmitter and receiver circuitry;
an interconnect system for communicating with the wireless transmitter and receiver circuitry and a first peripheral device; and
a hub controller for managing data traffic to the first peripheral device, the hub controller including a virtualization engine to receive virtual address translation data for the first peripheral device from an operating system, to support a virtual instance of the first peripheral device and to automatically forward tote virtual address translation data to the first peripheral device upon receipt of the virtual address translation data from the operating system, the virtual address translation data including virtual address mapping data for a virtual instance of the first peripheral device.

19. The system of claim 18, further comprising:
the first peripheral device coupled to the interconnect system.

20. The system of claim 18, wherein the hub controller further comprises:
a cache to store virtual address translation data.

21. The system of claim 11, wherein the hub controller further comprises:
a communication port to transmit the virtual address translation data to the first device.

22. The apparatus of claim 21, wherein the communication port is a root controller of an interconnect.

23. The system of claim 14, wherein the interconnect system is a peripheral component interconnect express (PCIe) interconnect.

24. The system of claim 11, wherein the first peripheral device is a peripheral device with a cache for storing virtual address translation data.

25. The apparatus of claim 11, wherein the hub controller further comprises:
a direct memory access controller in communication with the virtualization engine to control data transfer between the first device and a main memory.

* * * * *